US012570581B2

(12) United States Patent　　　(10) Patent No.: US 12,570,581 B2
Aoki et al.　　　(45) Date of Patent: Mar. 10, 2026

(54) POROUS HONEYCOMB STRUCTURE AND METHOD FOR MANUFACTURING SAME

(71) Applicant: NGK INSULATORS, LTD., Nagoya-City (JP)

(72) Inventors: Tsubasa Aoki, Nagoya-City (JP); Koichi Sendo, Nagoya-City (JP)

(73) Assignee: NGK INSULATORS, LTD., Nagoya (JP)

( * ) Notice: Subject to any disclaimer, the term of this patent is extended or adjusted under 35 U.S.C. 154(b) by 639 days.

(21) Appl. No.: 17/457,312

(22) Filed: Dec. 2, 2021

(65) Prior Publication Data

US 2022/0267220 A1　　Aug. 25, 2022

(30) Foreign Application Priority Data

Feb. 25, 2021　(JP) ................................. 2021-029261

(51) Int. Cl.
　*C04B 35/195*　　(2006.01)
　*C04B 38/00*　　(2006.01)
　　(Continued)

(52) U.S. Cl.
　CPC ........ *C04B 38/0009* (2013.01); *C04B 35/195* (2013.01); *C04B 38/0054* (2013.01);
　　(Continued)

(58) Field of Classification Search
　CPC ................................................... C04B 35/195
　See application file for complete search history.

(56) References Cited

U.S. PATENT DOCUMENTS

2007/0107398 A1*　5/2007　Merkel ............ B01D 46/24491
　　　　　　　　　　　　　　　　　　　55/523
2007/0141301 A1*　6/2007　Boorom .............. C04B 38/0006
　　　　　　　　　　　　　　　　　　　428/116

(Continued)

FOREIGN PATENT DOCUMENTS

JP　　2012-509840 A　　4/2012
JP　　2015-145333 A　　8/2015
JP　　2020-182885 A　　11/2020

OTHER PUBLICATIONS

Japanese Office Action (Application No. 2021-029261) dated Jul. 4, 2023 (with English translation) (6 pages).

(Continued)

*Primary Examiner* — Humera N. Sheikh
*Assistant Examiner* — Julia L Rummel
(74) *Attorney, Agent, or Firm* — BURR PATENT LAW, PLLC

(57) ABSTRACT

A porous honeycomb structure including cordierite, having a plurality of cell channels which pass through an interior of the porous honeycomb structure and are partitioned by porous partition walls, wherein the porous partition walls have a porosity of 45 to 60% as measured by a mercury intrusion method, wherein in a volume-based cumulative pore diameter distribution measured by the mercury intrusion method, the porous partition walls have a cumulative 10% pore diameter (D10) and a cumulative 50% pore diameter (D50) calculated from a small pore side, and satisfy a relationship of $0.45 \leq (D50-D10)/D50$, and $3 \ \mu m \leq D50 \leq 10 \ \mu m$.

5 Claims, 4 Drawing Sheets

100
106
103
104

(51) Int. Cl.
    *C04B 38/10*     (2006.01)
    *F01N 3/022*     (2006.01)

(52) U.S. Cl.
    CPC ............ *C04B 38/007* (2013.01); *C04B 38/10*
                    (2013.01); *F01N 3/0222* (2013.01)

(56)                  References Cited

U.S. PATENT DOCUMENTS

| | | | |
|---|---|---|---|
| 2008/0032090 A1* | 2/2008 | Beall ................... | C04B 38/0009 |
| | | | 428/116 |
| 2008/0050557 A1* | 2/2008 | Beall ................... | C04B 38/0006 |
| | | | 428/116 |
| 2008/0138273 A1* | 6/2008 | Jiang ....................... | C01B 3/382 |
| | | | 422/600 |
| 2009/0143221 A1* | 6/2009 | Ogunwumi .......... | B01D 53/944 |
| | | | 428/116 |
| 2009/0220734 A1* | 9/2009 | Backhaus-Ricoult ....................... | |
| | | | C04B 38/0006 |
| | | | 428/116 |
| 2010/0129599 A1 | 5/2010 | Lu et al. | |
| 2013/0270258 A1* | 10/2013 | Kondo ................. | F01N 3/2828 |
| | | | 428/116 |
| 2017/0298794 A1 | 10/2017 | Okazaki | |
| 2020/0317580 A1* | 10/2020 | Lewis ................... | C04B 35/636 |
| 2022/0054978 A1 | 2/2022 | Koike et al. | |

OTHER PUBLICATIONS

German Office Action (with English translation) dated Jun. 16, 2025 (Application No. 10 2021 005 867.4).

* cited by examiner

100

106

103

104

POROUS HONEYCOMB STRUCTURE AND METHOD FOR MANUFACTURING SAME

CROSS REFERENCE TO RELATED APPLICATIONS

The present invention claims the benefit of priority to Japanese Patent Application No 2021-029261 filed on Feb. 25, 2021 with the Japanese Patent Office, the entire contents of which are incorporated herein by reference in its entirety.

FIELD OF THE INVENTION

The present invention relates to a porous honeycomb structure. The present invention also relates to a method for manufacturing a porous honeycomb structure.

BACKGROUND OF THE INVENTION

Porous honeycomb structures are excellent in heat resistance, thermal shock resistance, and oxidation resistance. Therefore, they have been widely used as a filter for collecting particulate matter contained in exhaust gas from an internal combustion engine, a boiler, or the like, and as a catalyst carrier for an exhaust gas purification catalyst.

As a material for forming a porous honeycomb structure, cordierite is often used because of its high thermal shock resistance. A porous honeycomb structure comprising cordierite can be manufactured by kneading a raw material composition obtained by appropriately adding various additives to a cordierite-forming raw material, a pore-forming material, a binder and a dispersion medium, thereby obtaining a green body, and subjecting it to extrusion molding through a predetermined die thereby preparing a honeycomb-shaped formed body (honeycomb formed body), followed by drying and then firing the honeycomb formed body.

Porosity and pore diameter distribution are known parameters that affect the performance of a porous honeycomb structure. Further, techniques for improving density, mechanical strength, coefficient of thermal expansion, thermal mass, and the like have been developed by controlling the porosity and the pore diameter distribution. For example, in Patent Literature 1 (Japanese Patent Application Publication No. 2012-509840), there is disclosed a porous cordierite ceramic body having a total porosity of 40 to 55%, a median pore diameter (d50) of less than 6 μm, and a pore diameter distribution with a df value (=(d50–d10)/d50) of less than 0.4. In Patent Literature 2 (Japanese Patent Application Publication No. 2015-145333), there is disclosed a porous cordierite ceramic body having a total porosity of 40 to 55%, a median pore diameter (d50) of 3 to 10 μm, and a pore diameter distribution with a df value (=(d50–d10)/d50) of less than 0.4.

PRIOR ART

Patent Literature

[Patent Literature 1] Japanese Patent Application Publication No. 2012-509840
[Patent Literature 2] Japanese Patent Application Publication No. 2015-145333

SUMMARY OF THE INVENTION

As suggested in Patent Literature 1 and Patent Literature 2, conventionally, in a porous honeycomb structure comprising cordierite, the pore diameter is reduced and the pore diameter distribution is narrowed to improve the performance of the porous honeycomb structure. However, according to the research results of the present inventors, it has been found that the method of reducing the pore diameter and narrowing the pore diameter distribution does not always exhibit satisfactory thermal shock resistance. Since the porous honeycomb structure is often expected to be used in an environment where the temperature fluctuates greatly, it is practically advantageous to acquire excellent thermal shock resistance.

The present invention has been created in view of the above circumstances, and in one embodiment, an object is to improve thermal shock resistance in a porous honeycomb structure comprising cordierite. Further, in another embodiment of the invention, an object is to provide a method for manufacturing such a porous honeycomb structure.

As a result of diligent studies to solve the above problems, the present inventors have found that in a porous honeycomb structure comprising cordierite, while the pore diameter should be reduced overall, as the pore diameter distribution gets wider, higher thermal shock resistance can be obtained. The present invention has been completed based on the above findings, and is exemplified as below.

[1]

A porous honeycomb structure comprising cordierite, having a plurality of cell channels which pass through an interior of the porous honeycomb structure and are partitioned by porous partition walls, wherein the porous partition walls have a porosity of 45 to 60% as measured by a mercury intrusion method, wherein in a volume-based cumulative pore diameter distribution measured by the mercury intrusion method, the porous partition walls have a cumulative 10% pore diameter (D10) and a cumulative 50% pore diameter (D50) calculated from a small pore side, and satisfy a relationship of $0.45 \leq (D50-D10)/D50$, and $3$ $\mu m \leq D50 \leq 10$ μm.

[2]

The porous honeycomb structure according to [1], satisfying $0.50 \leq (D50-D10)/D50$.

[3]

The porous honeycomb structure according to [1] or [2], wherein in the volume-based cumulative pore diameter distribution measured by the mercury intrusion method, the porous partition walls have the cumulative 10% pore diameter (D10), the cumulative 50% pore diameter (D50), and a cumulative 90% pore diameter (D90) calculated from a small pore side, and satisfy a relationship of $1.3 \leq (D90-D10)/D50$.

[4]

The porous honeycomb structure according to [3], satisfying $1.7 \leq (D90-D10)/D50$.

[5]

The porous honeycomb structure according to any one of [1] to [4], wherein a thickness of the porous partition walls is 40 to 150 μm.

[6]

The porous honeycomb structure according to any one of [1] to [5], wherein the porous partition walls have a Young's modulus measured by a resonance method of 8 to 15 GPa.

[7]

A method for manufacturing the porous honeycomb structure according to any one of [1] to [6], comprising:

obtaining a honeycomb formed body by forming a green body comprising a cordierite-forming raw material, an organic pore-forming material, a binder and a dispersion medium, the honeycomb formed body having a plurality of cell channels which pass through an interior of the honeycomb formed body and are partitioned by porous partition walls, and firing the honeycomb formed body;

wherein the organic pore-forming material is contained in the honeycomb formed body in an amount of 1.5 parts by mass or more with respect to 100 parts by mass of the cordierite-forming raw material, and in a volume-based cumulative particle diameter distribution measured by a laser diffraction/scattering method, the organic pore-forming material has a cumulative 10% diameter (D10) and a cumulative 50% diameter (D50) calculated from a small particle side, and satisfies a relationship of $0.32 \leq (D50-D10)/D50$, and $10 \ \mu m \leq D50 \leq 30 \ \mu m$.

[8]

The method according to [7], wherein in the volume-based cumulative particle diameter distribution measured by a laser diffraction/scattering method, the organic pore-forming material has the cumulative 10% pore diameter (D10), the cumulative 50% diameter (D50), and a cumulative 90% diameter (D90) calculated from a small particle side, and satisfies a relationship of $0.80 \leq (D90-D10)/D50$.

According to one embodiment of the present invention, it is possible to improve the thermal shock resistance in a porous honeycomb structure comprising cordierite. By improving the thermal shock resistance of the porous honeycomb structure, it is possible to improve the durability when used as a catalyst carrier in an environment with a large temperature fluctuation such as an exhaust gas line of an automobile.

DETAILED DESCRIPTION OF THE INVENTION

Hereinafter, embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention.

1. Porous Honeycomb Structure Comprising Cordierite

In one embodiment, the porous honeycomb structure comprising cordierite according to the present invention has a plurality of cell channels which pass through the interior of the porous honeycomb structure and are partitioned by porous partition walls. In one embodiment, the porous honeycomb structure is provided as a wall-through type or wall-flow type pillar-shaped honeycomb structure. The use of the porous honeycomb structure is not particularly limited. For example, it is used in various industrial applications such as heat sinks, filters (example: GPF, DPF), catalyst carriers, sliding parts, nozzles, heat exchangers, electrical insulating members and parts for semiconductor manufacturing equipment. Among these, it can be suitably used as a filter for collecting particulate matter contained in exhaust gas from an internal combustion engine, a boiler, or the like, or as a catalyst carrier for an exhaust gas purification catalyst. In particular, the porous honeycomb structure can be suitably used as an exhaust gas filter and/or a catalyst carrier for automobiles.

The mass ratio of cordierite in the porous honeycomb structure comprising cordierite is preferably 50% by mass or more, preferably 70% by mass or more, and preferably 90% by mass or more. The mass ratio of cordierite in the porous honeycomb structure containing cordierite can be substantially 100% by mass, aside from unavoidable impurities.

Figure 1:
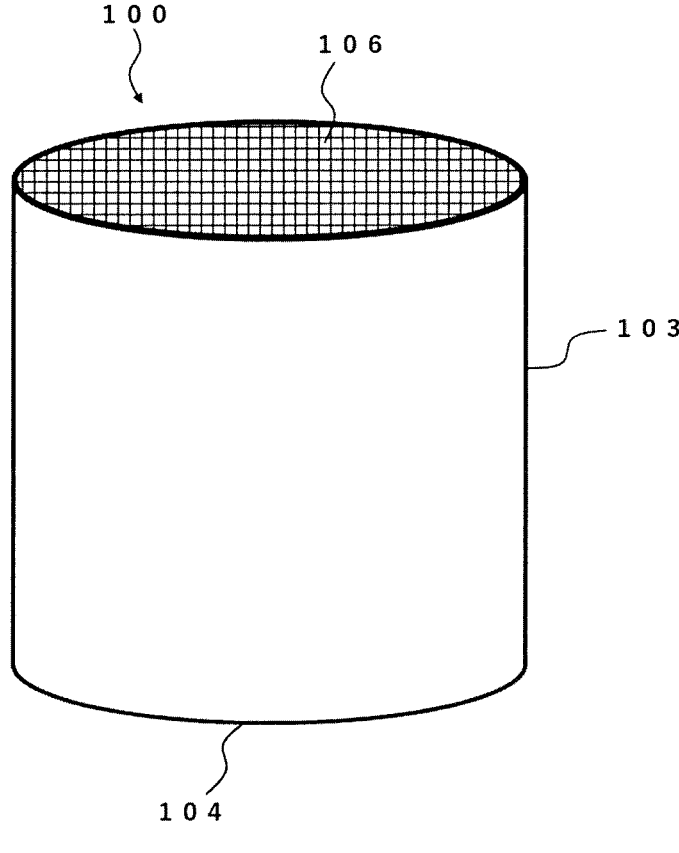
FIG. 1 is a perspective view schematically showing a wall-through type honeycomb structure.
Figure 2:
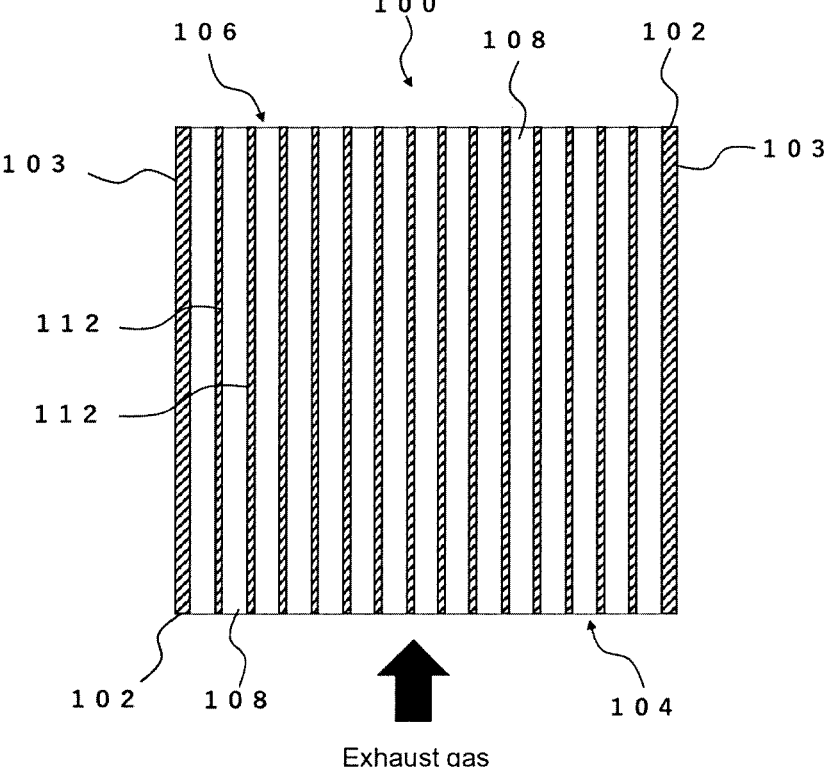
FIG. 2 is a schematic cross-sectional view of a wall-through type honeycomb structure observed in a cross section parallel to the direction in which the cells extend.

FIGS. 1 and 2 illustrate schematic a perspective view and a cross-sectional view of a pillar-shaped honeycomb structure 100 applicable as a wall-through type exhaust gas filter and/or catalyst carrier for automobiles, respectively. The pillar-shaped honeycomb structure 100 has an outer peripheral side wall 102, and porous partition walls 112 provided on the inner peripheral side of the outer peripheral side wall 102, partitioning a plurality of cells 108 forming fluid flow paths (cell channels) from a first end surface 104 to a second end surface 106. The outer surface of the outer peripheral side wall 102 forms the side surface 103 of the pillar-shaped honeycomb structure 100. In the pillar-shaped honeycomb structure 100, both ends of each cell 108 are open, and the exhaust gas flowing into one cell 108 from the first end surface 104 is purified while passing through the cell, and flows out from the second end surface 106. Herein, the first end surface 104 is on the upstream side of the exhaust gas and the second end surface 106 is on the downstream side of the exhaust gas, but this distinction between the first end surface and the second end surface is merely for convenience, and the second end surface 106 may be on the upstream side of the exhaust gas, and the first end surface 104 may be on the downstream side of the exhaust gas.

Figure 3:
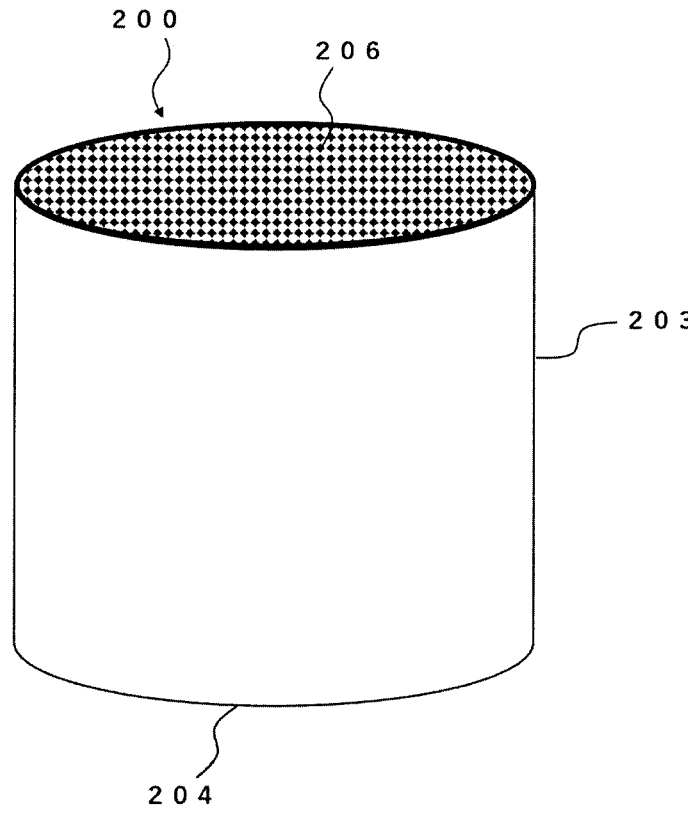
FIG. 3 is a perspective view schematically showing a wall-flow type honeycomb structure.
Figure 4:
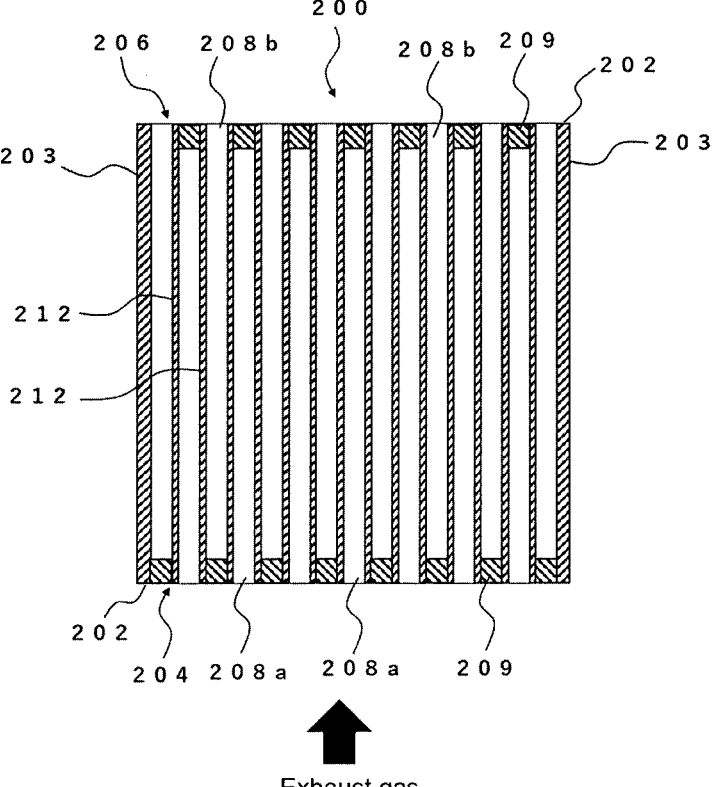
FIG. 4 is a schematic cross-sectional view of a wall-flow type honeycomb structure observed in a cross section parallel to the direction in which the cells extend.

FIGS. 3 and 4 illustrate schematic a perspective view and a cross-sectional view of a pillar-shaped honeycomb structure 200 applicable as a wall-flow type exhaust gas filter and/or catalyst carrier for automobiles, respectively. The pillar-shaped honeycomb structure 200 has an outer peripheral side wall 202, and porous partition walls 212 provided on the inner peripheral side of the outer peripheral side wall 202, partitioning a plurality of cells 208a, 208b forming fluid flow paths from a first end surface 204 to a second end surface 206. The outer surface of the outer peripheral side wall 202 forms the side surface 203 of the pillar-shaped honeycomb structure 200.

In the pillar-shaped honeycomb structure 200, the plurality of cells 208a and 208b can be divided into a plurality of first cells 208a extending from the first end surface 204 to the second end surface 206, opening on the first end surface 204 and having plugged portions 209 on the second end surface 206, and a plurality of second cells 208b extending from the first end surface 204 to the second end surface 206, having plugged portions 209 on the first end surface 204 and opening on the second end surface 206. Further, in the pillar-shaped honeycomb structure 200, the first cells 208a and the second cells 208b are alternately arranged adjacent to each other with the porous partition walls 212 interposed therebetween.

When exhaust gas containing particulate matter such as soot is supplied to the first end surface 204 on the upstream side of the pillar-shaped honeycomb structure 200, the exhaust gas is introduced into the first cells 208*a* and proceeds downstream in the first cells 208*a*. Since the first cells 208*a* have plugged portions 209 on the second end surface 206 on the downstream side, the exhaust gas passes through the porous partition walls 212 that partition the first cells 208*a* and the second cells 208*b*, and flows into the second cells 208*b*. Since the particulate matter cannot pass through the porous partition walls 212, it is collected and deposited in the first cells 208*a*. After the particulate matter is removed, the clean exhaust gas that has flowed into the second cells 208*b* proceeds downstream in the second cells 208*b* and flows out from the second end surface 206 on the downstream side. Herein, the first end surface 204 is on the upstream side of the exhaust gas and the second end surface 206 is on the downstream side of the exhaust gas, but this distinction between the first end surface and the second end surface is merely for convenience, and the second end surface 206 may be on the upstream side of the exhaust gas, and the first end surface 204 may be on the downstream side of the exhaust gas.

The lower limit of the porosity of the porous partition walls may be appropriately adjusted according to the usage, but from the viewpoint of suppressing the pressure loss of the fluid, it is preferably 45% or more, and more preferably 50% or more. In addition, the upper limit of the porosity of the partition walls is preferably 60% or less, more preferably 55% or less, from the viewpoint of ensuring the strength of the honeycomb fired body. The porosity is measured by the mercury intrusion method using a mercury porosimeter. The mercury intrusion method is specified in JIS R1655: 2003.

In order to enhance the thermal shock resistance of the porous honeycomb structure, it is advantageous to control the pore diameter distribution. In order to improve the gas purification performance, while the pore diameter is reduced overall, as the pore diameter distribution gets wider, higher thermal shock resistance can be obtained. Although the present invention is not intended to be bound by any theory, it is presumed that this is due to the following reasons. When the pore diameter distribution is sharp as in prior arts, the neck thickness of the base material constituting the partition walls becomes uniform, and the strength of the neck portions also becomes uniform, so that cracks are likely to occur. On the other hand, when the pore diameter distribution is broad, the neck portions of the base material is non-uniform, so the strength of the neck portion is also non-uniform, and cracks are unlikely to occur due to being reinforced by the strong neck portions existing in places.

Specifically, in a volume-based cumulative pore diameter distribution measured by the mercury intrusion method, it is preferable that the porous partition walls have a cumulative 10% pore diameter (D10) and a cumulative 50% pore diameter (D50) calculated from a small pore side, and satisfy a relationship of $0.45 \leq (D50-D10)/D50$, more preferably satisfy a relationship of $0.50 \leq (D50-D10)/D50$, and even more preferably satisfy a relationship of $0.55 \leq (D50-D10)/D50$. Although no upper limit is set for $(D50-D10)/D50$, it is ordinary to satisfy $(D50-D10)/D50 \leq 0.80$, and is typical to satisfy $(D50-D10)/D50 \leq 0.70$, more typical to satisfy $(D50-D10)/D50 \leq 0.60$. The mercury intrusion method is specified in JIS R1655: 2003.

Further, it is desirable that the porous partition walls satisfy $3 \text{ } \mu m \leq D50 \leq 10 \text{ } \mu m$ in addition to the above-mentioned conditions $(D50-D10)/D50$. When the lower limit of the cumulative 50% pore diameter (D50) in the porous partition walls is 3 μm or more, there is an advantage that detachment of the exhaust gas purification catalyst can be suppressed. The lower limit of D50 of the porous partition walls is preferably 4 μm or more, and more preferably 5 μm or more. Further, when the upper limit of the cumulative 50% pore diameter (D50) in the porous partition walls is 10 μm or less, there is an advantage that the infiltration of the exhaust gas purification catalyst into the partition walls can be suppressed. The upper limit of D50 of the porous partition walls is preferably 8 μm or less, and more preferably 6 μm or less.

Furthermore, in the volume-based cumulative pore diameter distribution measured by the mercury intrusion method, it is preferable that the porous partition walls have the cumulative 10% pore diameter (D10), the cumulative 50% pore diameter (D50), and a cumulative 90% pore diameter (D90) calculated from a small pore side, and satisfy a relationship of $1.3 \leq (D90-D10)/D50$, more preferably satisfy a relationship of $1.5 \leq (D90-D10)/D50$, even more preferably satisfy a relationship of $1.7 \leq (D90-D10)/D50$, even more preferably satisfy a relationship of $1.9 \leq (D90-D10)/D50$, and most preferably satisfy a relationship of $2.1 \leq (D90-D10)/D50$. Although no upper limit is set for $(D90-D10)/D50$, it is ordinary to satisfy $(D90-D10)/D50 \leq 2.8$, and typical to satisfy $(D90-D10)/D50 \leq 2.6$, more typical to satisfy $(D90-D10)/D50 \leq 2.4$. The mercury intrusion method is specified in JIS R1655: 2003.

In one embodiment, the porous partition walls have a Young's modulus measured by a resonance method of 8 to 15 GPa. When the lower limit of Young's modulus of the porous partition walls is 8 GPa or more, there is an advantage that the partition wall strength can be secured. The lower limit of Young's modulus of the porous partition walls is preferably 9 GPa or more, and more preferably 10 GPa or more. Further, when the upper limit of Young's modulus of the porous partition walls is 15 GPa or less, there is an advantage that the thermal shock resistance is improved. The upper limit of Young's modulus of the porous partition walls is preferably 14 GPa or less, and more preferably 13 GPa or less. The resonance method is specified in JIS R1602-1995.

For the above-described pore characteristics (porosity and pore diameter distribution) and Young's modulus of the porous honeycomb structure, the average value obtained by collecting and measuring samples from a plurality of locations of the porous honeycomb structure is used as a measured value.

The shape of each end surface of the pillar-shaped honeycomb structure is not particularly limited, but for example, a round shape such as a circular shape, an elongated circular shape, an elliptical shape, an oval shape, and a shape composed of a plurality of different arc components, as well as a polygonal shape such as a triangular shape or a quadrangular shape can be mentioned. The round shape refers to a shape composed of simple closed-convex curves having no inwardly recessed outer peripheral contour portion among simple closed curves.

The shape of the cells in the cross-section perpendicular to the flow path direction of the cells is not limited, but is preferably a quadrangle, a hexagon, an octagon, or a combination thereof. Among these, a square and a hexagon are preferred. By making the cell shape in this way, the pressure loss when a fluid is passed through the pillar-shaped honeycomb structure is reduced, and the gas purification performance is excellent.

The area of each end surface of the pillar-shaped honeycomb structure is not particularly limited, but can be, for example, 1900 to 97000 mm², and typically 6400 to 32000 mm².

The height of the pillar-shaped honeycomb structure (the length from the first end surface to the second end surface) is not particularly limited and may be appropriately set according to the usage and required performance. The height of the pillar-shaped honeycomb structure can be, for example, 40 mm to 300 mm. There is no particular limitation on the relationship between the height of the pillar-shaped honeycomb structure and the maximum diameter of each end surface (referred to as the maximum length of the diameters passing through the center of gravity of each end surface of the pillar-shaped honeycomb structure). Therefore, the height of the pillar-shaped honeycomb structure may be longer than the maximum diameter of each end surface, or the height of the pillar-shaped honeycomb structure may be shorter than the maximum diameter of each end surface.

The cell density (number of cells per unit cross-sectional area) is also not particularly limited, and can be, for example, 6 to 2000 cells/square inch (0.9 to 311 cells/cm²), more preferably 50 to 1000 cells/square inch (7.8 to 155 cells/cm²), particularly preferably 100 to 600 cells/square inch (15.5 to 92.0 cells/cm²). Here, the cell density is calculated by dividing the number of cells on one end surface (including the plugged cells) by the area of the end surface excluding the outer peripheral side wall.

The thickness of the porous partition walls is also not particularly limited, but is preferably 40 μm to 150 μm, for example. From the viewpoint of enhancing the strength and gas purification performance of the pillar-shaped honeycomb structure, the lower limit of the thickness of the partition walls is preferably 40 μm or more, and more preferably 50 μm or more. In addition, from the viewpoint of suppressing pressure loss, the upper limit of the thickness of the partition walls is preferably 150 μm or less, and more preferably 100 μm or less. In the present specification, the thickness of a partition wall refers to a crossing length of a line segment that crosses the partition wall when the centers of gravity of adjacent cells are connected by the line segment in a cross-section perpendicular to the direction in which the cells extend.

2. Manufacturing Method

The porous honeycomb structure according to one embodiment of the present invention can be manufactured by, for example, the following manufacturing method. First, a raw material composition containing a cordierite-forming raw material, an organic pore-forming material, a binder, a dispersion medium and, if necessary, other additives (surfactant and the like) is kneaded to form a green body. Next, a desired honeycomb formed body, typically a pillar-shaped honeycomb formed body, is prepared by molding the green body. Extrusion molding can be preferably used as the molding method. In the extrusion molding, by using a die having a desired overall shape, cell shape, partition wall thickness, cell density, and the like, it is possible to construct a honeycomb structure having a plurality of cell channels which pass through the interior of the porous honeycomb formed body and are partitioned by partition walls.

The cordierite-forming raw material is a raw material that becomes cordierite by firing. Talc, kaolin, alumina, aluminum hydroxide, silica, and the like can be used as the cordierite-forming raw material. It is desirable that the chemical composition is alumina ($Al_2O_3$): 30 to 45% by mass (including the amount of aluminum hydroxide that is converted to alumina), magnesia (MgO): 11 to 17% by mass, and silica ($SiO_2$): 42 to 57% by mass.

Since the cordierite-forming raw materials, particularly talc and silica, significantly affect the pore diameter distribution of the porous honeycomb structure, it is preferable to use raw materials whose particle diameter has been adjusted by pulverization, sieving or the like. Specifically, in the volume-based cumulative particle diameter distribution measured by the laser diffraction/scattering method, the lower limit of the cumulative 50% particle diameter (D50) of each cordierite-forming raw material calculated from a small particle side is preferably 0.1 μm or more, more preferably 0.5 μm or more, and even more preferably 1.0 μm or more. In addition, the upper limit of the cumulative 50% particle diameter (D50) of each cordierite-forming raw material from a small particle side is preferably 20 μm or less, more preferably 15 μm or less, and even more preferably 12 μm or less.

Examples of the organic pore-forming material include polymer compounds such as polyacrylic acid-based polymers, starches, foaming resins, and polymethylmethacrylate (PMMA), as well as coke (carbon fuel). In particular, it is preferable to use a polyacrylic acid-based polymers. As the organic pore-forming material, one type may be used alone, or two or more types may be used in combination. From the viewpoint of increasing the porosity of the honeycomb structure, the lower limit of the content of the organic pore-forming material is preferably 0.5 parts by mass or more, preferably 1.0 part by mass or more, and even more preferably 1.5 parts by mass or more, with respect to 100 parts by mass of the cordierite-forming raw material. From the viewpoint of ensuring the strength of the honeycomb structure, the upper limit of the content of the organic pore-forming material is preferably 10.0 parts by mass or less, more preferably 7.5 parts by mass or less, and even more preferably 5.0 parts by mass or less, with respect to 100 parts by mass of the cordierite-forming raw material.

The particle diameter distribution of the organic pore-forming material significantly affects the pore characteristics of the porous honeycomb structure. Therefore, it is required to use an organic pore-forming material having an appropriate particle diameter distribution obtained by pulverization, sieving, or the like. Specifically, in a volume-based cumulative particle diameter distribution measured by a laser diffraction/scattering method, it is preferable that the organic pore-forming material has a cumulative 10% pore diameter (D10) and a cumulative 50% pore diameter (D50) calculated from a small particle side, and satisfies a relationship of $0.32 \leq (D50-D10)/D50$, more preferably satisfies a relationship of $0.33 \leq (D50-D10)/D50$, and even more preferably satisfies a relationship of $0.34 \leq (D50-D10)/D50$. Although no upper limit is set for (D50-D10)/D50, it is ordinary to satisfy $(D50-D10)/D50 \leq 0.80$, and is typical to satisfy $(D50-010)/D50 \leq 0.70$, more typical to satisfy $(D50-010)/D50 \leq 0.60$, and it is advantageous to satisfy $(D50-010)/D50 \leq 0.40$.

Further, it is desirable that the organic pore-forming material satisfies 10 μm $D50 \leq 30$ μm in addition to the above-mentioned conditions for (D50-D10)/D50. When the lower limit of the cumulative 50% particle diameter (D50) of the organic pore-forming material is 10 μm or more, there is an advantage that pore diameters having a size effective for suppressing detachment of the exhaust gas purification catalyst can be obtained. The lower limit of D50 of the organic pore-forming material is preferably 13 μm or more, and more preferably 15 μm or more. Further, when the upper limit of the cumulative 50% particle diameter (D50) of the organic pore-forming material is 30 μm or less, there is an advantage that pore diameters having a size effective for suppressing the infiltration of the exhaust gas purification catalyst into the base material can be obtained. The upper limit of D50 of the organic pore-forming material is preferably 28 μm or less, and more preferably 25 μm or less.

Furthermore, in the volume-based cumulative particle diameter distribution measured by a laser diffraction/scattering method, it is preferable that the organic pore-forming material has the cumulative 10% diameter (D10), the cumulative 50% diameter (D50), and a cumulative 90% diameter (D90) calculated from a small particle side, and satisfies a relationship of $0.75 \leq (D90-D10)/D50$, more preferably satisfies a relationship of $0.78 \leq (D90-D10)/D50$, and even more preferably satisfies a relationship of $0.80 \leq (D90-D10)/D50$. Although no upper limit is set for (D90−D10)/D50, it is common to satisfy $(D90-D10)/D50 \leq 1.50$, and is typical to satisfy $(D90-D10)/D50 \leq 1.45$, and is more typical to satisfy $(D90-D10)/D50 \leq 1.40$.

Examples of the binder include organic binders such as methyl cellulose, hydroxypropoxyl cellulose, hydroxyethyl cellulose, carboxymethyl cellulose, and polyvinyl alcohol. In particular, it is preferable to use methyl cellulose and hydroxypropoxyl cellulose in combination. Further, the content of the binder is preferably 4 parts by mass or more, more preferably 5 parts by mass or more, and even more preferably 6 parts by mass or more, with respect to 100 parts by mass of the cordierite-forming raw material, from the viewpoint of increasing the strength of the honeycomb formed body. The content of the binder is preferably 10 parts by mass or less, more preferably 9 parts by mass or less, with respect to 100 parts by mass of the cordierite-forming raw material, from the viewpoint of suppressing the occurrence of cracking due to abnormal heat generation in the firing step. As the binder, one type can be used alone, or two or more types can be used in combination.

Examples of the dispersion medium include water or a mixed solvent of water and an organic solvent such as alcohol, and water can be particularly preferably used.

The surfactant is not particularly limited, and examples thereof include ethylene glycol, dextrin, fatty acid soap, and polyalcohol. These can be used alone or as a combination of two or more. The content of the surfactant is not particularly limited, but is preferably 5 parts by mass or less, more preferably 3 parts by mass or less, and for example, may be 0.5 to 2 parts by mass, with respect to 100 parts by mass of the cordierite-forming raw material.

After the honeycomb formed body is dried, a porous honeycomb structure can be obtained by performing degreasing and firing. Known conditions may be adopted as the conditions for the drying step, the degreasing step, and the firing step. Although no particular explanation is required, specific examples of the conditions are given below.

In the drying step, conventionally known drying methods such as hot gas drying, microwave drying, dielectric drying, decompression drying, vacuum drying, and freeze drying can be used. Among them, a drying method combining hot gas drying with microwave drying or dielectric drying is preferable in that the entire formed body can be dried quickly and uniformly. When forming the plugged portions, the plugged portions are formed at predetermined positions at the end of the cell channels of the dried honeycomb formed body, and then the plugged portions are dried to obtain a honeycomb dried body.

Next, the degreasing step will be described. The combustion temperature of the binder is about 200° C., and the combustion temperature of the pore-forming material is about 300 to 1000° C. Therefore, the degreasing step may be carried out by heating the honeycomb formed body in the range of about 200 to 1000° C. The heating time is not particularly limited, but is usually about 10 to 100 hours. The honeycomb formed body after the degreasing step is called a calcined body.

The firing step depends on the material composition of the honeycomb formed body, but can be performed, for example, by heating the calcined body at 1350 to 1600° C. and maintaining it for 3 to 10 hours.

When the porous honeycomb structure is used as a catalyst carrier, the catalyst can be carried on the porous partition walls. The method itself for having the porous partition walls carry the catalyst is not particularly limited, and a known method may be adopted. Examples thereof include a method in which a catalyst composition slurry is brought into contact with the porous partition walls, and then dried and fired.

It is desirable that the catalyst composition slurry contains an appropriate catalyst depending on its use. The catalyst is not limited, but mention can be made to oxidation catalyst, reduction catalyst and three-way catalyst for removing pollutants such as soot, nitrogen oxides ($NO_x$), soluble organic fractions (SOF), hydrocarbons (HC) and carbon monoxide (CO). In particular, when the porous honeycomb structure according to the present invention is used as a filter such as DPF or GPF, since particulate matters (PM) such as soot and SOF in the exhaust gas are collected by the filter, it is preferable to carry a catalyst that assists the combustion of the particulate matters. The catalyst can appropriately contain, for example, noble metals (Pt, Pd, Rh, and the like), alkali metals (Li, Na, K, Cs, and the like), alkaline earth metals (Ca, Ba, Sr, and the like), rare earths (Ce, Sm, Gd, Nd, Y, Zr, Ca, La, Pr, and the like), transition metals (Mn, Fe, Co, Ni, Cu, Zn, Sc, Ti, V, Cr, and the like) and the like.

EXAMPLES

Examples 1 to 6, Comparative Examples 1 to 4

(1) Manufacture of a Porous Honeycomb Structure Comprising Cordierite

According to the test numbers, with each mass ratio shown in Table 2, ordierite-forming raw materials (talc, kaolin, alumina, aluminum hydroxide, silica), organic pore-forming materials (polyacrylic acid-based polymers), binders (hydroxypropoxyl cellulose), surfactant (fatty acid soap), and water were kneaded to prepare a green body. As the organic pore-forming material, two types of polymers A and B having adjusted particle diameter distributions were used.

The volume-based cumulative particle diameter distributions of the cordierite-forming raw materials and the polymers A and B used above were measured by a laser diffraction/scattering method using a particle diameter distribution measuring device (product name: LA-960 manufactured by HORIBA, Ltd.). At this time, a sample (powder) and water (if difficult to disperse, an aqueous solution of β-naphthalene sulfonic acid formaldehyde condensate, sodium salt was also added) were placed in a cell, mixed and dispersed, and then set in the particle diameter distribution measuring device. Table 1 shows the cumulative 10% diameter (D10), the cumulative 50% diameter (D50), the cumulative 90% diameter (D90), (D50−D10)/D50, and (D90−D10)/D50 of the polymer A and the polymer B, as well as the polymer mixture in Example 6 in which the polymer A and the polymer B were mixed. Table 2 shows the cumulative 50% diameter (D50) of the cordierite-forming raw materials and the polymers A and B.

TABLE 1

| | Polymer | | |
| --- | --- | --- | --- |
| | A | B | A + B (Example 6) |
| D10 (μm) | 6.5 | 16.1 | 7.9 |
| D50 (μm) | 9.4 | 24.8 | 19.4 |
| D90 (μm) | 13.3 | 37.1 | 33.9 |
| (D50 − D10)/D50 | 0.31 | 0.35 | 0.59 |
| (D90 − D10)/D50 | 0.72 | 0.84 | 1.34 |

TABLE 2

| | | Raw materials for porous honeycomb structure | | | | | | | | | |
| --- | --- | --- | --- | --- | --- | --- | --- | --- | --- | --- | --- |
| | | Cordierite-forming raw material | | | | | Polymer | | | | |
| | | | | | Aluminum | | | | | | |
| Material | | Talc | Kaolin | Alumina | hydroxide | Silica | A | B | Binder | Surfactant | Water |
| Particle diameter D50 (μm) | | 10.0 | 5.0 | 5.0 | 3.0 | 5.0 | 9.4 | 24.8 | — | — | — |
| Example 1 | Parts by | 40 | 30 | 10 | 10 | 10 | | 2.5 | 8.0 | 1.0 | 50 |
| Example 2 | mass | 40 | 30 | 10 | 10 | 10 | | 2.0 | 8.0 | 1.0 | 47 |
| Example 3 | | 40 | 30 | 10 | 10 | 10 | | 3.3 | 8.0 | 1.0 | 55 |
| Example 4 | | 40 | 15 | 25 | 5 | 15 | | 4.5 | 8.0 | 1.0 | 60 |
| Example 5 | | 40 | 30 | 10 | 10 | 10 | | 2.2 | 8.0 | 1.0 | 49 |
| Example 6 | | 40 | 30 | 10 | 10 | 10 | 1.0 | 1.8 | 8.0 | 1.0 | 53 |
| Comparative Example 1 | | 40 | 30 | 10 | 10 | 10 | 3.2 | | 8.0 | 1.0 | 50 |
| Comparative Example 2 | | 40 | 10 | 10 | 25 | 15 | 2.8 | | 8.0 | 1.0 | 51 |
| Comparative Example 3 | | 40 | 10 | 15 | 15 | 20 | 3.5 | | 8.0 | 1.0 | 60 |
| Comparative Example 4 | | 40 | | 20 | 20 | 20 | 3.5 | | 8.0 | 1.0 | 55 |

According to the test numbers, each of the green bodies was put into a continuous extrusion molding machine and extruded through a die having a predetermined shape to obtain a cylindrical honeycomb formed body. The obtained cylindrical honeycomb molded body was subjected to dielectric drying and hot gas drying, and then both end surfaces were cut to have predetermined dimensions thereby obtaining a honeycomb dried body.

The obtained honeycomb dried body was degreased by heating at about 200° C. for about 8 hours in an air atmosphere, and further fired at about 1430° C. for 4 hours in an air atmosphere to obtain a porous honeycomb structure comprising cordierite according to each test number. Further, a number of porous honeycomb structures comprising cordierite according to each test number were prepared as required for the following characteristic evaluation.

(2) Specifications

The specifications of the obtained porous honeycomb structure were as follows.

Overall shape: cylindrical shape with a diameter of about 132 mm and a height of about 90 mm Cell shape in a cross-section perpendicular to the flow path direction of the cells: square Cell density (number of cells per unit cross-sectional area): see Table 3.

Partition wall thickness: see Table 3 (nominal value based on die specifications)

(3) Pore Characteristics (Porosity, Pore Diameter Distribution)

The porosity and volume-based cumulative pore diameter distribution (D10, D50, D90) of the porous partition walls of the porous honeycomb structure comprising cordierite obtained by the above-described manufacturing method were measured by a mercury porosimeter (product name: AutoPore IV manufactured by Micromeritics) according to the mercury intrusion method specified in JIS R1655: 2003. For the measurement with the mercury porosimeter, samples (length×width×height=about 13 mm×about 13 mm×about 13 mm cube) were collected from two locations at the center of the cylindrical porous honeycomb structure in the height direction, one near the center in the radial direction and the other near the outer perimeter. The average value was used as the measured value. At this time, the true density of cordierite was regarded as 2.52 g/cm$^3$. Table 3 shows the measurement results of the porosity and the pore diameter distribution for the porous honeycomb structure according to each test number.

(4) Young's Modulus

Young's modulus of the porous honeycomb structure according to each test number was measured by the resonance method specified in JIS R1602-1995 using an elastic modulus measuring device. For the measurement of Young's modulus (=elastic modulus by bending resonance method), samples (width×thickness×length=about 20 mm×about 10 mm×about 9 mm cuboid) were collected from two locations at the center of the cylindrical porous honeycomb structure in the height direction, one near the center in the radial direction and the other near the outer perimeter. The average value was used as the measured value.

(5) Thermal Shock Resistance

The thermal shock resistance of the porous honeycomb structure according to each test number was measured by the following method. The results are shown in Table 3.

1. Placing the porous honeycomb structure in an electric furnace maintained at a set temperature (initial set temperature=550° C.) for 1200 seconds.
2. Removing the porous honeycomb structure from the electric furnace, placing it on a heat-resistant brick at room temperature, and allowing it to cool naturally for 15 minutes.
3. After 15 minutes, using a cooling fan to reduce the temperature of the porous honeycomb structure to room temperature.
4. Visually check for cracks.
5. If there are no cracks, it is qualified as success.
6. If there are no cracks, raising the set temperature of 1. by 50° C., and repeating the above procedures until cracks occur, and the measured value is regarded as "temperature at which crack occurred −50° C.".

208b Second cell
212 Partition wall
The invention claimed is:
1. A porous honeycomb structure comprising 70% by mass or more of cordierite, having a plurality of cell channels which pass through an interior of the porous honeycomb structure and are partitioned by porous partition walls,
  wherein the porous partition walls have a porosity of 45 to 60% as measured by a mercury intrusion method,
  wherein in a volume-based cumulative pore diameter distribution measured by the mercury intrusion method, the porous partition walls have a cumulative 10% pore diameter (D10), a cumulative 50% pore diameter (D50), and a cumulative 90% pore diameter (D90) calculated from the volume-based cumulative pore

TABLE 3

| | Cell structure | | Pore characteristics | | | | | | Material characteristics | |
| | | | | | | | | | | Thermal shock |
| | Partition wall thickness (mil) | Cell density (cpsi) | Porosity (%) | D50 (μm) | D10 (μm) | D90 (μm) | (D50 − D10)/D50 df Value | (D90 − D10)/D50 | Young's modulus (GPa) | resistance (° C.) |
|---|---|---|---|---|---|---|---|---|---|---|
| Example 1 | 2 | 900 | 47.8 | 5.3 | 2.3 | 13.5 | 0.56 | 2.11 | 13.4 | 750 |
| Example 2 | 2 | 900 | 46.0 | 5.6 | 2.6 | 14.9 | 0.53 | 2.20 | 14.4 | 750 |
| Example 3 | 2 | 900 | 51.5 | 5.7 | 2.5 | 12.8 | 0.56 | 1.79 | 11.3 | 750 |
| Example 4 | 3 | 800 | 56.3 | 4.5 | 1.8 | 7.9 | 0.59 | 1.35 | 9.9 | 750 |
| Example 5 | 2 | 900 | 46.8 | 5.8 | 3.1 | 15.7 | 0.46 | 2.16 | 14.8 | 700 |
| Example 6 | 2 | 900 | 50.4 | 5.0 | 2.5 | 11.5 | 0.49 | 1.80 | 11.6 | 700 |
| Comparative Example 1 | 2 | 900 | 47.5 | 3.6 | 2.3 | 6.7 | 0.36 | 1.24 | 15.7 | 550 |
| Comparative Example 2 | 2 | 900 | 47.1 | 3.4 | 2.1 | 6.8 | 0.39 | 1.39 | 16.4 | 550 |
| Comparative Example 3 | 3 | 800 | 50.7 | 3.4 | 1.9 | 7.0 | 0.43 | 1.48 | 12.1 | 600 |
| Comparative Example 4 | 3 | 600 | 55.0 | 5.3 | 3.1 | 10.0 | 0.41 | 1.31 | 10.9 | 600 |

(6) Discuss

As can be seen from the results shown in Table 3, Examples 1 to 6 and Comparative Examples 1 to 4 satisfy the condition of 3 μm≤D50≤10 μm, and the pore diameter is small as a whole. However, it can be seen that in Examples 1 to 6, the thermal shock resistance is remarkably improved as compared with Comparative Examples 1 to 4 because the relationship of 0.45≤(D50−D10)/D50 is further satisfied and the pore diameter distribution is wide. Further, it can be seen that among Examples 1 to 6, Examples 1 to 4 satisfying 0.50≤(D50−D10)/D50 were particularly excellent in thermal shock resistance.

DESCRIPTION OF REFERENCE NUMERALS

100 Pillar-shaped honeycomb structure
102 Outer peripheral side wall
103 Side surface
104 First end surface
106 Second end surface
108 Cell
112 Partition wall
200 Pillar-shaped honeycomb structure
202 Outer peripheral side wall
203 Side surface
204 First end surface
206 Second end surface
208a First cell diameter distribution, and satisfy relationships 1.7≤ (D90−D10)/D50, 0.45≤(D50-D10)/D50, and 3 μm≤D50≤6 μm, and
  wherein the porous partition walls have a Young's modulus measured by a resonance method of 10 to 14 GPa.
2. The porous honeycomb structure according to claim 1, satisfying 0.50≤(D50−D10)/D50.
3. The porous honeycomb structure according to claim 1, wherein thickness of the porous partition walls is 40 to 150 μm.
4. A method for manufacturing the porous honeycomb structure according to claim 1, comprising:
  molding a green body comprising a cordierite-forming raw material, an organic pore-forming material, a binder and a dispersion medium to obtain a honeycomb formed body, the honeycomb formed body having a plurality of cell channels which pass through an interior of the honeycomb formed body and are partitioned by partition walls, and
  firing the honeycomb formed body to obtain the porous honeycomb structure;
  wherein the organic pore-forming material is contained in the honeycomb formed body in an amount of 1.5 parts by mass or more with respect to 100 parts by mass of the cordierite-forming raw material, and in a volume-based cumulative particle diameter distribution measured by a laser diffraction/scattering method, the organic pore-forming material has a cumulative 10% diameter (D10) and a cumulative 50% diameter (D50)

calculated from the volume-based cumulative particle diameter distribution, and satisfies a relationship of $0.32 \leq (D50-D10)/D50$, and $10 \ \mu m \leq D50 \leq 30 \ \mu m$.

5. The method according to claim 4, wherein in the volume-based cumulative particle diameter distribution measured by a laser diffraction/scattering method, the organic pore-forming material has the cumulative 10% diameter (D10), the cumulative 50% diameter (D50), and a cumulative 90% diameter (D90) calculated from the volume-based cumulative particle diameter distribution, and satisfies a relationship of $0.80 \leq (D90-D10)/D50$.

* * * * *